United States Patent
Tian et al.

(10) Patent No.: US 9,366,748 B2
(45) Date of Patent: Jun. 14, 2016

(54) POSITION LOCATION SYSTEM ARCHITECTURE: PEER TO PEER MEASUREMENT MODE

(71) Applicant: QUALCOMM Incorporated, San Diego, CA (US)

(72) Inventors: Bin Tian, San Diego, CA (US); Ahmad Jalali, Rancho San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/916,259

(22) Filed: Jun. 12, 2013

(65) Prior Publication Data

US 2014/0368334 A1   Dec. 18, 2014

(51) Int. Cl.
| | |
|---|---|
| G08B 1/08 | (2006.01) |
| G01S 5/02 | (2010.01) |
| H04W 64/00 | (2009.01) |
| H04W 84/18 | (2009.01) |

(52) U.S. Cl.
CPC ............. *G01S 5/0289* (2013.01); *H04W 64/00* (2013.01); *H04W 84/18* (2013.01)

(58) Field of Classification Search
CPC ..... G01S 5/0289; H04W 64/00; H04W 84/18
USPC .............. 340/539.1, 539.11, 539.13, 506
See application file for complete search history.

(56) References Cited

U.S. PATENT DOCUMENTS

| | | |
|---|---|---|
| 7,005,985 B1 | 2/2006 | Steeves |
| 7,203,458 B1 | 4/2007 | Cheng |
| 8,599,758 B1 | 12/2013 | Ogale et al. |
| 9,244,152 B1 | 1/2016 | Thiagarajan |
| 2003/0013146 A1 | 1/2003 | Werb |
| 2009/0207694 A1 | 8/2009 | Guigne et al. |
| 2009/0238210 A1 | 9/2009 | Myers et al. |
| 2009/0303067 A1 | 12/2009 | Sharp |
| 2010/0109842 A1 | 5/2010 | Patel et al. |
| 2010/0112950 A1 | 5/2010 | Haartsen et al. |

(Continued)

FOREIGN PATENT DOCUMENTS

| | | |
|---|---|---|
| EP | 1480386 A2 | 11/2004 |
| WO | WO-0046771 A1 | 8/2000 |

(Continued)

OTHER PUBLICATIONS

Frattasi S., et al., "Ad-Coop Positioning System (ACPS): Positioning for cooperative users in hybrid cellular ad-hoc networks", European Transactions on Telecommunications, Wiley & Sons, Chichester, GB, vol. 19, No. 8, Dec. 1, 2008, pp. 923-934, XP001523185, ISSN: 1124-318X, DOI: 10.1002/ETT.1223.

(Continued)

*Primary Examiner* — Daryl Pope
(74) *Attorney, Agent, or Firm* — Bala Ramasamy (57) ABSTRACT

A position location method includes receiving, over a messaging link, a request from an access point of a position location system to perform a ranging operation between a first asset tag and a second asset tag. The method also includes transmitting, by the first asset tag, a first ranging pilot signal on a ranging link to enable the ranging operation between the first asset tag and the second asset tag. The method further includes receiving, by the first asset tag, a second ranging pilot signal on the ranging link from the second asset tag.

24 Claims, 7 Drawing Sheets

(56) References Cited

U.S. PATENT DOCUMENTS

| | | |
|---|---|---|
| 2010/0141432 A1 | 6/2010 | Sugla |
| 2010/0215478 A1 | 8/2010 | Oda et al. |
| 2011/0111751 A1 | 5/2011 | Markhovsky et al. |
| 2011/0169607 A1 | 7/2011 | Paulson |
| 2012/0002702 A1 | 1/2012 | Lakkis et al. |
| 2012/0032855 A1 | 2/2012 | Reede et al. |
| 2012/0044786 A1 | 2/2012 | Booij et al. |
| 2012/0315919 A1 | 12/2012 | Hirsch |
| 2013/0191019 A1 | 7/2013 | Pakzad |
| 2013/0211780 A1 | 8/2013 | Meador et al. |
| 2014/0152437 A1 | 6/2014 | Tian et al. |
| 2014/0156180 A1 | 6/2014 | Marti et al. |
| 2014/0329536 A1 | 11/2014 | Tian et al. |
| 2015/0168543 A1 | 6/2015 | Tian |
| 2015/0169911 A1 | 6/2015 | Tian |

FOREIGN PATENT DOCUMENTS

| | | |
|---|---|---|
| WO | 0110154 A1 | 2/2001 |
| WO | WO-02088776 A2 | 11/2002 |
| WO | 2007076301 A2 | 7/2007 |
| WO | WO-2011149497 A1 | 12/2011 |
| WO | WO-2011153291 A2 | 12/2011 |

OTHER PUBLICATIONS

International Search Report and Written Opinion—PCT/US2014/041979—ISA/EPO—Jan. 26, 2015.

Mensing., C., et al., "Centralized cooperative positioning and tracking with realistic communications constraints", Positioning Navigation and Communication (WPNC), 2010 7th Workshop on, IEEE, Piscataway, NJ, USA, Mar. 11, 2010, pp. 215-223, XP031813395, ISBN 978-1-4244-7158-4.

Pahlavan, et al., "Indoor Geolocation Science and Technology", IEEE Communications Magazine, vol. 40, No. 2, pp. 112-118, Feb. 2002.

Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013, pp. 1-13, XP068040470, [retrieved on Jan. 12, 2013] p. 4-p. 6 p. 11.

Wibowo S.B., et al., "Time of Flight Ranging using Off-the-self IEEE802.11 WiFi Tags", May 28, 2009, 5 Pages, XP55185248, Retrieved from the Internet: URL: http://www.locon-eu.com/Documents/POCAConference_CIT_Sigit.pdf [retrieved on Apr. 22, 2015] p. 1, right-hand column, paragraph 3 Section II figure 1.

POSITION LOCATION SYSTEM ARCHITECTURE: PEER TO PEER MEASUREMENT MODE

FIELD

Aspects of the present disclosure relate generally to wireless communication systems, and more particularly to a position location architecture.

BACKGROUND

Wireless networks are widely deployed to provide various communication services such as voice, video, packet data, messaging, broadcasting and other like wireless communication services. These wireless networks may be multiple-access networks capable of supporting multiple users by sharing the available network resources. In a wireless local area network (WLAN), an access point supports communication for a number of wireless stations within the wireless network. In an ad-hoc mode, the wireless stations ("peer nodes") communicate in a peer-to-peer (P2P) manner without an access point. Similarly, a peer-to-peer network allows the peer nodes to directly communicate with one another. In a peer-to-peer network, peer-to-peer nodes within range of one another discover and communicate directly without an access point.

A positioning system may refer to a network of devices used to wirelessly locate objects or people, for example, inside a building. Instead of using a satellite positioning system (SPS), a positioning system may rely on nearby nodes that actively locate tags.

SUMMARY

In one aspect, a position location method is disclosed. The method includes receiving, over a messaging link, a request from an access point of a position location system to perform a ranging operation between a first asset tag and a second asset tag of the position location system. The method also includes transmitting, by the first asset tag, a first ranging pilot signal on a ranging link to enable the ranging operation between the first asset tag and the second asset tag. The method also includes receiving, by the first asset tag, a second ranging pilot signal on the ranging link from the second asset tag.

In another aspect, a position location system is disclosed. The system includes a first asset tag configured to receive a request from an access point over a messaging link to perform a ranging operation. The position location system also includes a second asset tag configured to receive a first ranging pilot signal from the first asset tag over a ranging link. The second asset tag is also configured to transmit a second ranging pilot signal to the first asset tag over the ranging link. In the position location system, the first asset tag receives the second ranging pilot signal from the second asset tag and the ranging operation is performed based on the first ranging pilot signal and the second ranging pilot signal.

Another aspect discloses an apparatus for position location including means for receiving, over a messaging link, a request from an access point of a position location system to perform a ranging operation between a first asset tag and a second asset tag. The apparatus also includes means for transmitting, by the first asset tag, a first ranging pilot signal on a ranging link to enable the ranging operation between the first asset tag and the second asset tag. The apparatus also includes means for receiving, by the first asset tag, a second ranging pilot signal on the ranging link from the second asset tag.

In another aspect, a computer program product for position location having a non-transitory computer-readable medium is disclosed. The computer readable medium has non-transitory program code recorded thereon which, when executed by the processor(s), causes the processor(s) to receive, over a messaging link, a request from an access point of a position location system to perform a ranging operation between a first asset tag and a second asset tag of a position location system. The program code also causes the processor(s) to transmit, by the first asset tag, a first ranging pilot signal on a ranging link to enable the ranging operation between the first asset tag and the second asset tag. The program code also causes the processor(s) to receive, by the first asset tag, a second ranging pilot signal on the ranging link from the second asset tag.

In another aspect, a position location method is disclosed. The method includes requesting a ranging operation between a first asset tag and a second asset tag over a messaging link. A first ranging signal is transmitted on a ranging link between the first asset tag and the second asset tag and a second ranging signal is transmitted on the ranging link between the second asset tag and the first asset tag. The method further includes determining a range between the first asset tag and the second asset tag based on the first ranging signal and the second ranging signal.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

In one aspect of the disclosure, a position location system tracks the location of assets (e.g., users) using a device that may be worn by an asset, referred to herein as an "asset tag." The asset tag may support wireless node functionality (e.g., a wireless station and/or a wireless node of a peer-to-peer network), or other like radio access technology. It should be recognized that asset tag operation to enable the position location system may be incorporated into a wireless handheld device of a user. Although the asset tags may be specified as stations, aspects of the disclosure also relate to ad-hoc and/or peer-to-peer network implementations in which wireless peer nodes and/or wireless stations discover and communicate directly without access points. A wireless station can be a dedicated access point or a temporary access point (e.g., a soft access point) configured for access point functionality, for example, when operating according to a wireless local area network (WLAN) infrastructure mode. In a WLAN ad-hoc mode, or peer-to-peer network, the wireless stations/peer nodes discover and communicate directly without an access point.

In one aspect of the disclosure, the asset tags transmit known preambles that are received by multiple access points (APs). The access points may estimate and send the time of arrival (TOA) of the preamble from a specific asset tag to a position location server. The position location server processes received TOAs from the multiple access points to estimate the position of the asset tags. In another configuration, the access points transmit a known pilot signal that is received by all asset tags in the respective coverage area of the access points. In this configuration, the asset tags make TOA measurements based on the received pilot signals from different access points. The asset tags may compute their position based on the TOA measurements or send the TOA measurements to a position location server (PLS) for position location computation. The position location system may be implemented in various wireless networks, such as the WLAN configuration shown in FIG. 1.

System Overview

Figure 1:
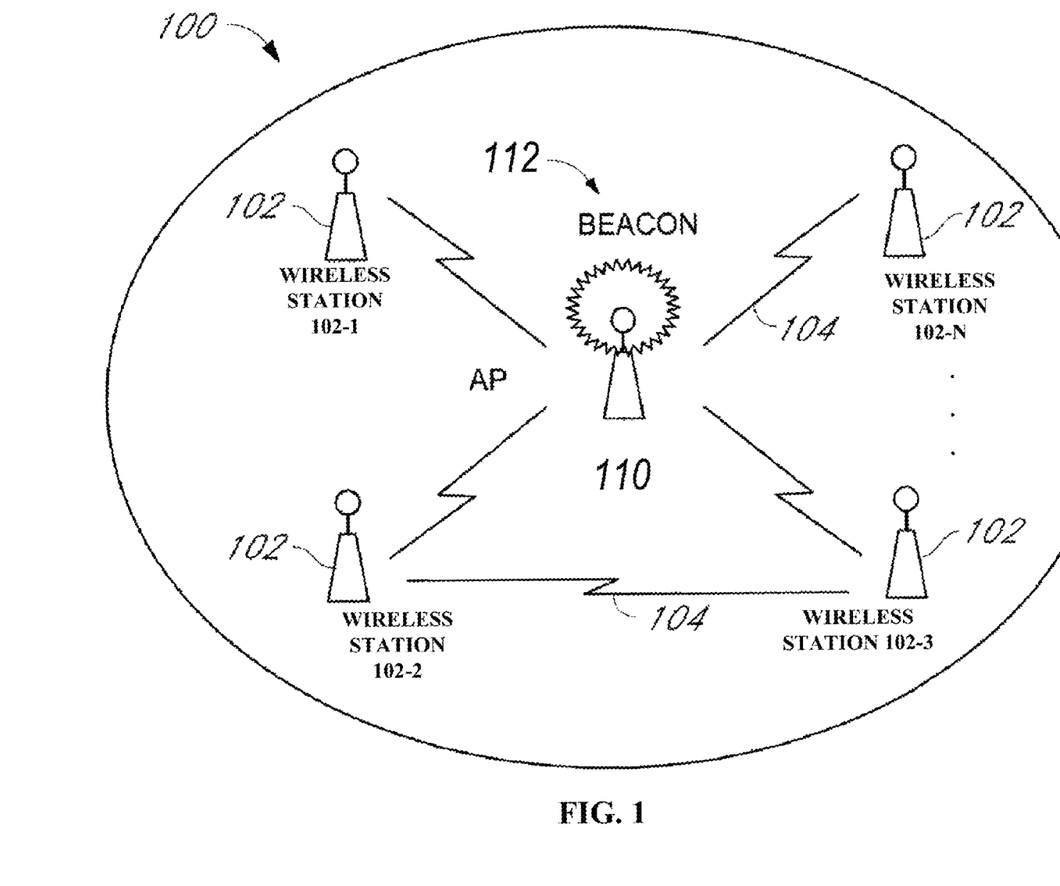
FIG. 1 illustrates a diagram of a communication system according to one aspect of the present disclosure.

One example of a wireless communication system 100 is illustrated in FIG. 1. The wireless communication system 100 may include a number of wireless stations 102 (102-1 . . . 102-N) and access points 110 that can communicate with one another over wireless links 104. Although the wireless communication system 100 is illustrated with five wireless stations/access points 102/103, it should be appreciated that any number of stations and access points (wired or wireless) may form the wireless communication system 100. In the illustration, the access points 110 are dedicated access points. Alternatively, the access points 110 may be configured for access point functionality (e.g., as a soft access point).

The wireless stations/access points 102/110 may be any device configured to send and receive wireless communications, such as a laptop computer, smartphone, a printer, a personal digital assistant, a camera, a cordless telephone, a session initiation protocol phone, a handheld device having wireless connection capability, a user equipment, an access terminal, or any other suitable device. In one aspect of the disclosure, the wireless stations/access points 102/110 are incorporated into a tag that is placed on an asset (e.g., a user). In the wireless communication system 100, the wireless stations/access points 102/110 may be distributed throughout a geographic region. Further, each wireless station/access point 102/110 may have a different coverage region over which it may communicate. The access points 110 may include or be implemented as a base station, a base transceiver station, a terminal, a wireless node operating as an access point, or the like. The wireless stations/access points 102/110 in the wireless communication system 100 may communicate wirelessly using any suitable wireless network standard.

In one configuration, an asset tag may be configured as one of the wireless stations 102 that associates with one of the access points 110 to send and/or receive position information from one of the access points 110 according to an initial wireless access message 112 (e.g., beacon) broadcast by one of the access points 110. In one aspect of the disclosure, the asset tags measure pilot signals from access points 110 and compute an asset tag position. Alternatively, the asset tags transmit the pilot measurements to a position location server. In another configuration, the asset tags transmit known preambles that are received by the access points 110. The access points 110 may estimate and send the time of arrival (TOA) of the preamble from a specific tag to the position location server that estimates the position of the asset tags. Position location computations may be carried out at the position location server using the TOAs received from the different access points 110, for example, as shown in FIG. 4.

Figure 2:
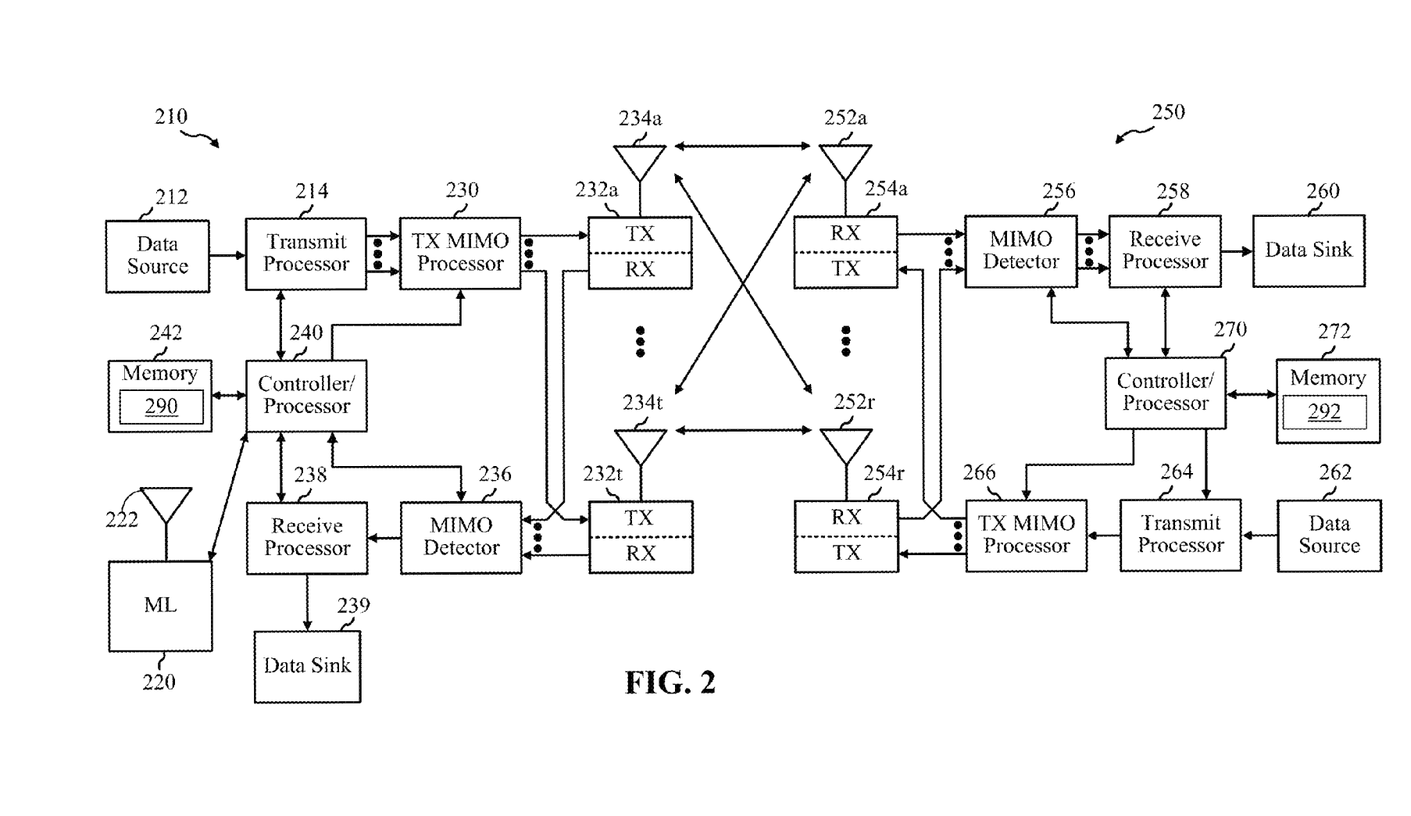
FIG. 2 is a block diagram illustrating an exemplary hardware configuration of wireless nodes used in the communication system, such as the position location system illustrated in FIG. 4.
Figure 3:
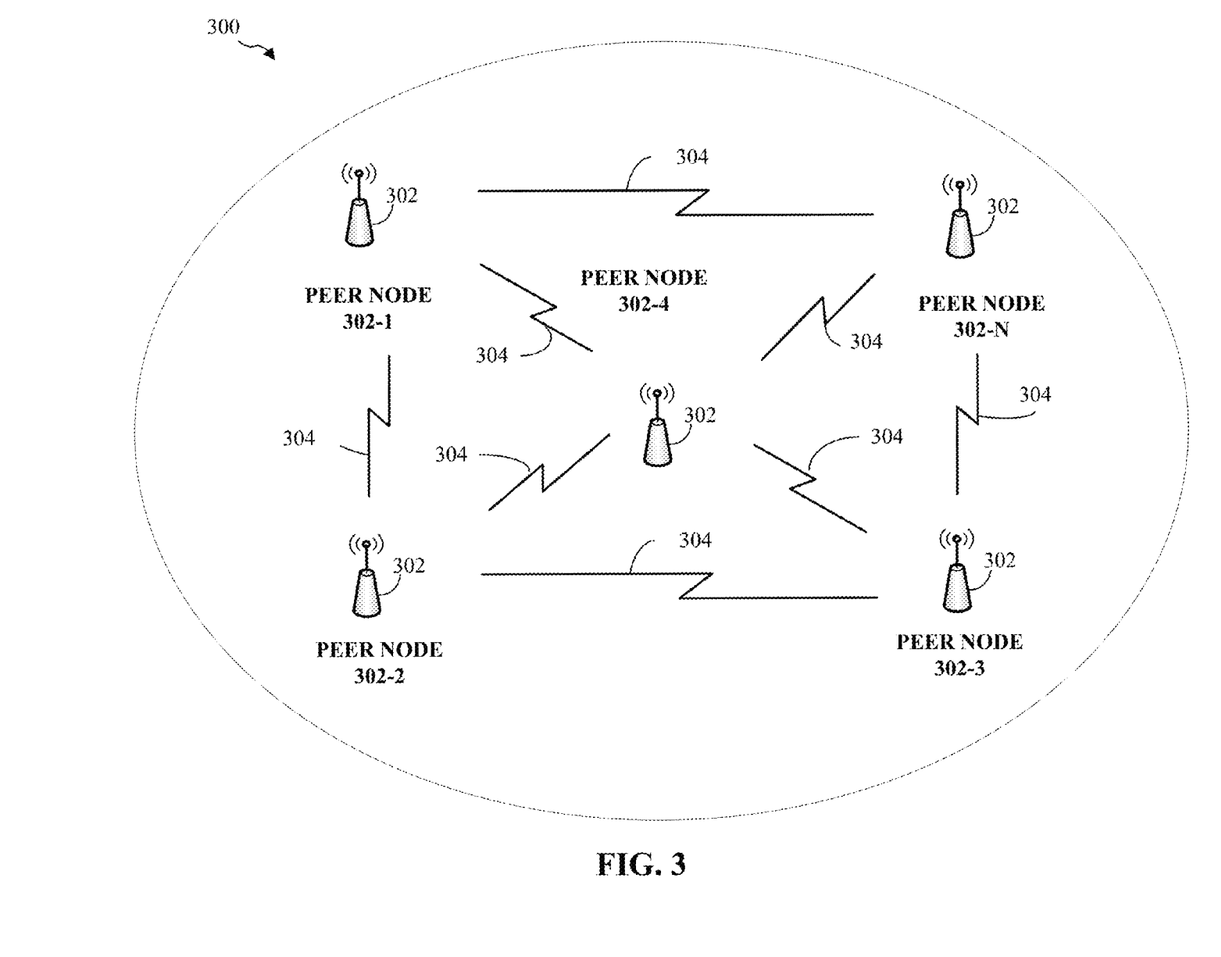
FIG. 3 illustrates a diagram of a peer-to-peer network according to one aspect of the present disclosure.
Figure 4:
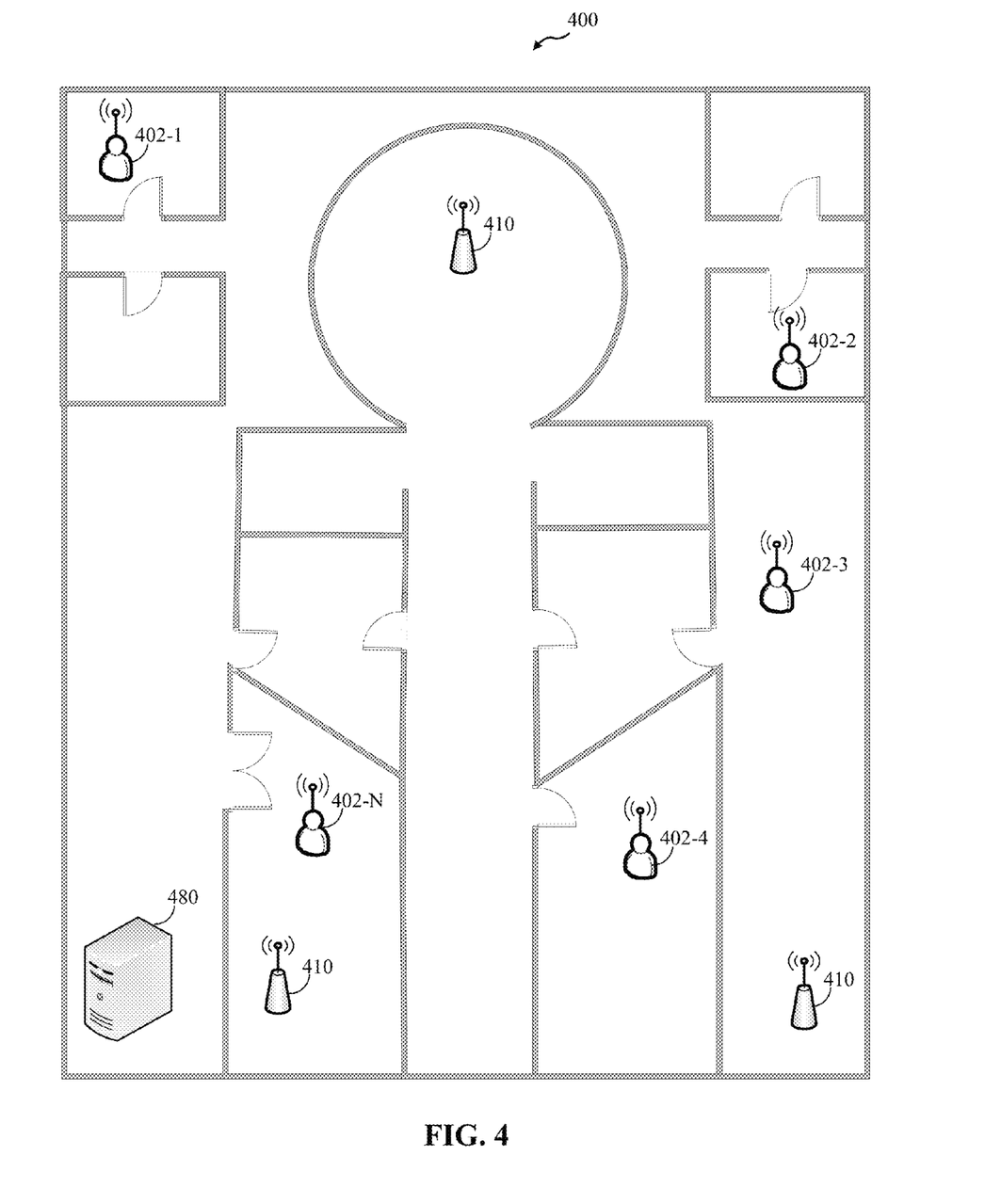
FIG. 4 is a diagram illustrating a position location system according to one aspect of the present disclosure.

FIG. 2 shows a block diagram of a design of an access point 210 and a wireless station 250, each of which may be one of the wireless nodes in FIGS. 1, 3, and 4. Each of the wireless nodes in the wireless communication system 100 may include a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel.

In one configuration, the access point 210 may be equipped with antennas 234 (234a, . . . , 234t), and the wireless station 250 may be equipped with antennas 252 (252a, . . . , 252r).

At the access point 210, a transmit processor 214 may receive data from a data source 212 and control information from a controller/processor 240. The transmit processor 214 may process (e.g., encode and symbol map) the data and control information to obtain data symbols and control symbols, respectively. The transmit processor 214 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transceivers 232 (232a, . . . , 232t). Each of the transceivers 232 may process a respective output symbol stream to obtain an output sample stream. Each of the transceivers 232 may further process (e.g., convert to analog, amplify, filter, and upconvert) the output sample stream to obtain a transmission signal. Signals from transceivers 232 may be transmitted via the antennas 234 (234a, . . . , 234t), respectively.

At the wireless station 250, the antennas 252 (252a, . . . , 252r) may receive the signals from the access point 210 and may provide received signals to the transceivers 254

(254a, ..., 254r), respectively. Each of the transceivers 254 may condition (e.g., filter, amplify, downconvert, and digitize) a respective received signal to obtain input samples. Each of the transceivers 254 may further process the input samples to obtain received symbols. A MIMO detector 256 may obtain received symbols from all of the transceivers 254, perform MIMO detection on the received symbols if applicable, and provide detected symbols. A receive processor 258 may process (e.g., demodulate, deinterleave, and decode) the detected symbols, provide decoded data for the wireless station 250 to a data sink 260, and provide decoded control information to a controller/processor 270.

When transmitting, from the wireless station 250, a transmit processor 264 may receive and process data from a data source 262 and control information from the controller/processor 270. The transmit processor 264 may also generate reference symbols for a reference signal. The symbols from the transmit processor 264 may be precoded by a TX MIMO processor 266 if applicable, further processed by the transceivers 254, and transmitted to the access point 210. At the access point 210, the signals received from the wireless station 250 may be received by the antennas 234, processed by the transceivers 232, detected by a MIMO detector 236 if applicable, and further processed by a receive processor 238 to obtain decoded data and control information sent by the wireless station 250. The receive processor 238 may provide the decoded data to a data sink 239 and the decoded control information to the controller/processor 240.

The access point 210 can send messages to other base stations, for example, over a backhaul link. In one configuration, the access point includes a messaging link (ML) 220 having an antenna 222 for enabling synchronization and ranging initialization between asset tags and access points of an in-door position location system, for example, as shown in FIG. 4. It should be recognized that the wireless station 250 may also be configured to include a messaging link, such as the messaging link 220 of the access point 210, although it is not shown. In one configuration, the messaging link may be a narrowband messaging link.

The controller/processor 240 may direct the operation at the access point 210 and the controller/processor 270 may direct the operation at wireless station 250, respectively. The controller/processor 270 and/or other processors and modules at the wireless station 250 may perform or direct the execution of the functional blocks illustrated in the method flow chart of FIG. 6 and/or other processes for the techniques described herein. The memory 242 may store data and program codes for the access point 210 and the memory 272 may store data and program codes for the wireless station 250. For example, the memory 272 of the wireless station 250 may store a position location module 292 which, when executed by the controller/processor 270, configures the wireless station 250 for operation within a position location system, for example, as shown in FIG. 4. Similarly, the memory 242 of the access point 210 may store a position location module 290 which, when executed by the controller/processor 240, configures the access point 210 for operation within the position location system shown in FIG. 4.

FIG. 3 illustrates a diagram of a peer-to-peer network 300 according to one aspect of the disclosure. In some aspects, a peer-to-peer network 300 may be established between two or more peer nodes 302 (302-1, 302-2, 302-3, 302-4, ... 302-N). The peer nodes 302 in the peer-to-peer network 300 may communicate wirelessly using any suitable wireless network standard. The peer-to-peer network 300 may include a number of peer nodes 302 that can communicate with one another over wireless links 304. An asset tag may be configured according to the wireless station 250 of FIG. 2, and operate as one of the peer nodes 302 of the peer-to-peer network 300.

For example, an asset tag that operates as one of the peer nodes 302-1 may associate with another of the peer nodes 302-4 to transmit known preambles that are received by the peer nodes 302. One of the peer nodes 302-1 may estimate and send the time of arrival (TOA) of the preamble from a specific asset tag to a position location server (not shown) that estimates the position of the asset tags. Position location computations may be carried out at the position location server using the TOAs received from the different peer nodes 302. In another configuration, the peer nodes 302 transmit a known pilot signal, which is typically a narrow bandwidth pilot signal, which is received by all asset tags in the respective coverage area of the peer nodes. In this configuration, the asset tags make TOA measurements on the received pilot signals from different peer nodes 302 and either compute the position at the asset tag or send the measurements to the position location server for position location computation.

An asset tag may be any device configured to send and receive wireless communications, such as a laptop computer, a smartphone, a printer, a personal digital assistant, a camera, a cordless telephone, a session initiation protocol phone, a handheld device having wireless connection capability, a user equipment, an access terminal, or any other suitable device that may be worn as an asset tag.

Positioning System Diagram

FIG. 4 is a diagram illustrating a position location system 400 according to one aspect of the disclosure. The position location system 400 may track assets (e.g., people) using asset tags 402 (402-1, ..., 402-N) that people wear. The asset tags 402 may be configured according to the wireless station 250 of FIG. 2 to support wireless node functionality (e.g., wireless stations and/or a wireless nodes of a peer-to-peer network), or other like radio access technology.

As shown in FIG. 4, the position location system 400 includes the asset tags 402, access points 410 installed on the premises, and a position location server 480 that estimates the position of the asset tags 402. In one configuration, the asset tags 402 transmit known preambles that are received by the access points 410. The access points 410 may estimate and send the time of arrival (TOA) of the preamble from a specific asset tag to the position location server 480. Position location computations may be carried out at the position location server 480 using the TOAs received from the different access points 410 or the estimation may be performed by some other estimator, within the access points 410 or at the position location server 480. This approach may help reduce the power consumption at the asset tags 402.

In another configuration, the access points 410 transmit a known pilot signal, which is received by all asset tags 402 in the respective coverage area of the access points 410. In this configuration, the asset tags 402 make TOA measurements based on the received pilot signals (also referred to as "pilots") from different access points 410. The asset tags 402 may either compute the position at one of the asset tags 402 or send the measurements to the position location server 480 for position location computation. In the configuration where the asset tags 402 measure the pilot signals from access points 410 and compute their respective position without the position location server 480, higher power consumption at the asset tags 402 may lower battery life.

The position location system 400 recognizes that the two basic functions of a tracking system, messaging and positioning, have different specifications. For messaging, one of the asset tags 402-1 communicates with one of the access points 410 (e.g., closest to the asset tag), in which a small amount of data is exchanged. As a result, bandwidth is not a primary concern in the messaging portion of the position location system 400. For positioning, ranging measurements may be made between asset tags 402 and the access points 410. As a result, the ranging operation may involve a longer access distance. Moreover, a wide bandwidth for a ranging signal is desired to achieve accurate range measurements. In one configuration, the position location system 400 provides the messaging and synchronization portion of the air interface of the system architecture on a first air interface (messaging link) and the ranging portion of the system architecture on a second air interface (ranging link). For example, the position location server 480 may be configured as shown in FIG. 2, in which one of the antennas 234 provides a ranging link and a messaging link (ML) 220 provides a messaging link. In one configuration, the ranging link may be a wideband ranging link.

In one configuration, a messaging link (e.g., the messaging link 220 of FIG. 2) is used for a messaging and synchronization to enable a subsequent ranging measurement. The messaging link 220 may be used by the asset tags 402 to communicate with access points 410 installed on the premises, as well as to provide coarse synchronization between the access points 410 and also between the access points 410 and the asset tags 402. In one configuration, the asset tags 402 wake up periodically and search for pilot signals transmitted by access points 410 on a relatively narrowband signal, such as one MHz of bandwidth, for example the messaging link 220, versus many tens or hundreds of MHz of bandwidth for a ranging link. The asset tags 402 detect the pilot signal and synchronize with one of the access points 410 within the coarse time of the narrowband signal. In another configuration, the asset tags 402, after waking up from sleep mode, send a reduced size packet to the access points 410 that the access points 410 use to measure a time and frequency error of the asset tags 402 with respect to the access points 410.

In this configuration, the access points 410 send the measurement results and other ranging related scheduling information back to the asset tags 402 after a predetermined delay. The asset tags 402 use the frequency and timing errors reported by the access points 410 to pre-correct their frequency and timing offset prior to sending a preamble to the access points 410. Pre-correcting at the asset tags 402 reduces the amount of time for performing a frequency and timing search at the access points 410. Once the coarse time synchronization is achieved, a ranging operation begins by exchanging preambles between the asset tags 402 and the access points 410. The coarse time synchronization allows a reduced search window in the ranging link. The asset tags 402 may also communicate with other asset tags in a peer-to-peer mode and measure a range between themselves on the ranging link (e.g., one the antennas 252 of FIG. 2 and which may also be a wideband ranging link). The coarse synchronization between the asset tags 402 obtained from the messaging link (e.g., the messaging link 220 of FIG. 2) helps the asset tags 402 reduce their search window when estimating a range in the peer-to-peer mode on a wideband ranging link (e.g., one of the antennas 252).

In this configuration, the wideband ranging link enables a ranging operation between the asset tags 402, the access points 410, and the position location server 480 of the position location system 400. In this configuration, the position location server 480 determines a location of at least one of the asset tags 402 according to the ranging operation. The wideband ranging link may be scheduled through the messaging link. In one configuration, the asset tags 402 specified for a ranging operation are known from when the wideband ranging preamble is transmitted and what pseudo noise (PN) sequence is used, based on scheduling information received through the messaging link. In this configuration, the amount of time in which the asset tags 402 are active may be reduced by using the scheduling information received through the messaging link.

One preamble design used in existing systems, such as the CDMA2000 family of protocols, includes a known preamble that is used on a given access channel between the asset tags 402 and the access points 410. There are multiple access channels, and different asset tags 402 are assigned to different access channels, with asset tags 402 assigned to each access channel. Devices that simultaneously transmit a preamble through the narrowband link may be assigned a different pseudo-random sequence or the same pseudo-random sequence with a different offset. The preamble signal consists of this known sequence to provide an asset tag identification (ID). To avoid different asset tags 402 from sending their preambles at the same time, the preamble transmission times of different asset tags 402 may be separated in time based on IDs of the asset tags 402 and/or hashing algorithms known to the asset tags 402 and to the access points 410.

Asset Tags Used in a Position Location System

The present disclosure may be used to track assets and/or people using tags, where the tags are placed on the people or the assets and known as "asset tags," such as the asset tags 402 (402-1, . . . , 402-N) shown in FIG. 4. In one configuration, a position location system includes asset tags placed on assets or people, access points installed on premises and a position location server that estimates the position of the asset tags. In one configuration, the asset tags transmit known preambles that are received by multiple access points. The access points may estimate and send the time of arrival of the preamble from a specific asset tag to the position location server. Position location computations may be carried out at the position location server using the times of arrival received from the different access points. This approach may help reduce the power consumption at the asset tag.

In another configuration, the access points transmit a known pilot signal that is received by all asset tags in their coverage area. In this configuration, the asset tags make time of arrival measurements on the received pilots from different access points. Then, the asset tags either compute the position at the asset tag or send measurements to the position location server for position location computation. In this configuration where the asset tags measure the pilot signals from access points and compute the position or send the measurements to the position location server, higher power consumption at the asset tag may lower battery life.

Aspects of the present disclosure recognize that the two basic functions of a tracking system—messaging and positioning—have different specifications. For messaging, an asset tag communicates with the closest access point, and typically a small amount of data is exchanged. As a result, bandwidth is not a main concern in the messaging portion of a position location system. For positioning, ranging measurements are made between asset tags and multiple access points. As a result, the ranging operation may demand longer access distance. In one configuration, the position location system provides the messaging and synchronization portion of the air interface in the system architecture on a first air interface (messaging link) and the ranging portion of the system architecture on a different air interface (ranging link).

Peer to Peer Measurement Mode

Figure 5:
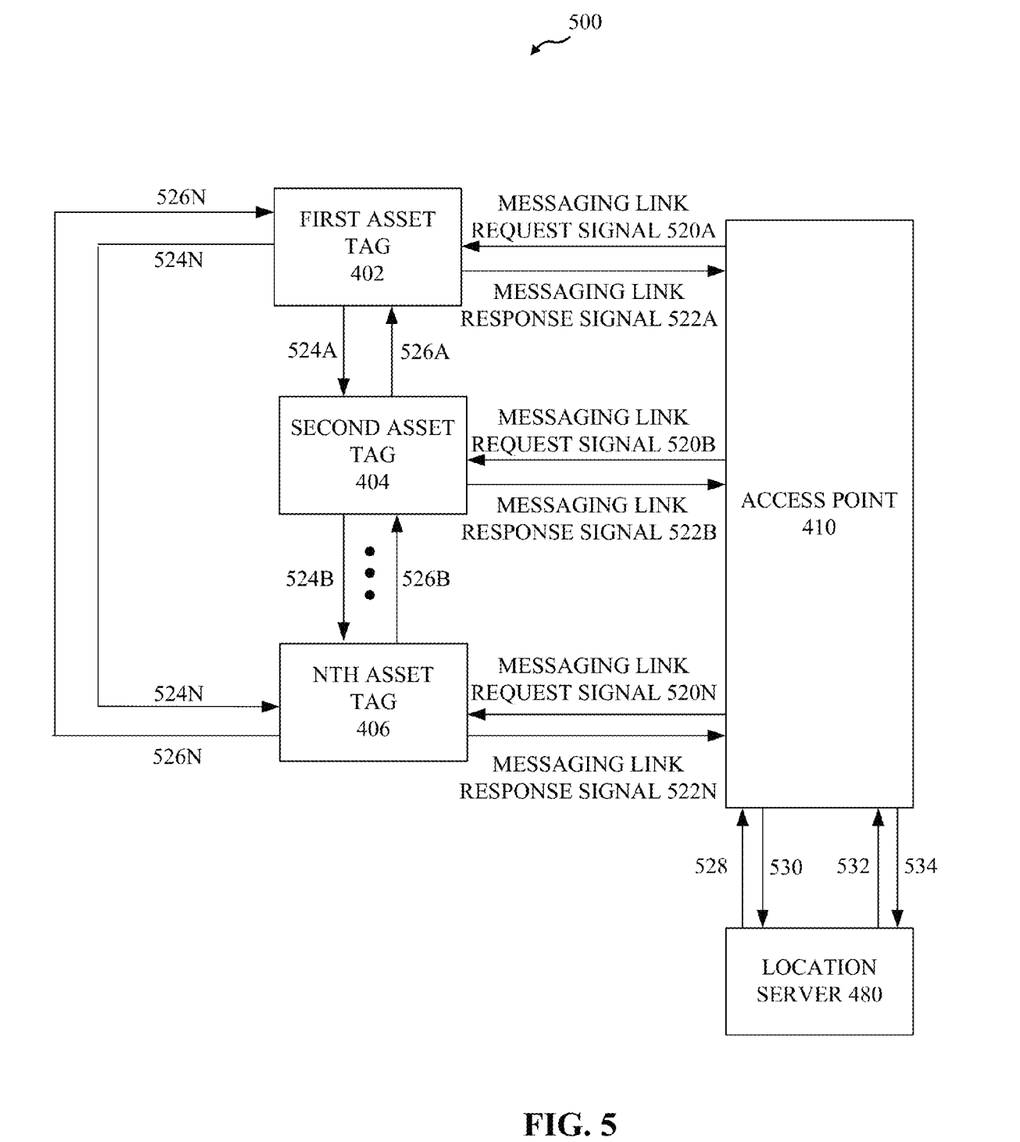
FIG. 5 is a block diagram illustrating signaling in accordance with one aspect of the present disclosure.

FIG. 5 is a block diagram 500 illustrating signaling in accordance with one aspect of the present disclosure. The position location system 400 may have asset tags, such as a first asset tag 402, a second asset tag 404 and an nth asset tag 406. Although three asset tags 402-406 are shown, the present disclosure is not limited to just three and can include any number of asset tags.

Messaging link request signals 520A, 520B and 520N are periodically sent from the access point 410 in the position location system 400. For example, they can be triggered when asset tags 402-406 are near each other. The messaging link request signals 520A, 520B, and 520N may be in response to a first request signal 528 or a second request signal 532 sent from the position location server 480 to the access point 410.

In one configuration, a messaging link is used for messaging (e.g., messaging link request signals 520A, 520B, 520N and messaging link response signals 522A, 522B, 522N). The messaging link is used for the asset tags 402-406 to communicate with the access point 410. The messaging link can also be used to provide coarse synchronization between the access point 410 and the asset tags 402-406.

The asset tags 402-406, for example, the first asset tag 402 may send a first pilot ranging signal 524A to another asset tag in the position location system 400, such as the second asset tag 404, to engage in ranging measurement and ranging estimates. The second asset tag 404 responds to the first asset tag 402 with a second pilot ranging signal 526A to allow the first asset tag 402 of its position and ranging distance relative to the first asset tag 402. In one configuration, the asset tags 402-406 may send the pilot ranging signals over a messaging link.

In one configuration, the asset tags 402, 404 and 406 may also communicate with the access point 410 using the messaging link response signals 522A, 522B and 522N. The access point 410 may then send the results of the ranging estimates and measurements from the asset tags 402, 404 and 406 back to the position location server 480. The access point 410 may use a first response signal 530 or a second response signal 534 to communicate the ranging estimates and measurements. In one configuration, the asset tags compute the range estimate. In another configuration, the position location server 480 generates the estimate.

The position of the asset tags 402-406 may be monitored by both the access point 410 and the position location server 480. The access point 410 reports the position and ranging data of the asset tags 402-406 to the position location server 480 on a periodic basis to monitor the position of the asset tags 402-406. In one configuration, the position location server 480 may request that the asset tags 402-406 estimate ranges between themselves, through direct measurements between the asset tags 402-406. This request from the position location server 480 may occur when the asset tags 402-406 are in close proximity to each other.

In one configuration, the position location server 480 sends a first request signal 528 to the access point 410. The first request signal 528 causes the access point 410 to send messaging link request signals 520A, 520B, 520N to the asset tags 402, 404 and 406 to determine their respective initial locations. Once their locations are determined, this information is sent back from the asset tags 402, 404 and 406 to the access point 410 (via the messaging link response signals 522A, 522B, 522N), and then back to the position location server 480 via the first response signal 530. In this configuration, the position location server 480 also sends a second request signal 532 to the access point 410. The second request signal 532 may trigger the access point 410 to send messaging link request signals 520A, 520B, 520N to the asset tags 402, 404 and 406 to determine their new locations, for example, if the asset tags have moved. Once their new locations are determined, this information is sent back from the asset tags 402, 404 and 406 to the access point 410 (via the messaging link response signals 522A, 522B, 522N), and then possibly back to the position location server 480 using a second response signal 534.

If the asset tags are determined to be in close proximity to each other, the position location server 480 sends a message to the access point 410 via either the first request signal 528 and/or the second request signal 532. Then, the access point 410 sends a message via the messaging link request signals 520A, 520B, 520N to two asset tags (such as two asset tags selected from the first asset tag 402, the second asset tag 404, and the nth asset tag 406). The message instructs the asset tags to make direct range measurements between themselves. In this configuration, the position location server 480 identifies one of the asset tags 402-406 as the master asset tag and the other asset tag(s) as the slave asset tag(s).

The position location server 480 may also specify a time instant relative to the messaging link frame boundary, or some other time epoch, where the master asset tag is to transmit a pilot ranging signal 524A, 524B, 524N on a ranging channel to communicate between different asset tags. The slave asset tag searches for the pilot ranging signal 524A, 524B, 524N at the same time epoch specified by the position location server 480. The slave asset tag may also transmit its own pilot ranging signal 526A, 526B, 526N upon reception of the master asset tag's pilot ranging signal 524A, 524B, 524N. The combination of the master and slave ranging pilot signal transmission and reception times are used by the master asset tag and/or the position location server 480 to estimate the round trip delay between the two asset tags. The round trip delay may provide an estimate of the range between the two asset tags. This approach can also be applied to more than two asset tags at a time.

One reason for using a ranging signal with a wide bandwidth is to enable an accurate estimate of the range between the first asset tag 402 and the second asset tag 404. However, the accuracy of the ranging estimate is a function of bandwidth as well as the received signal to noise ratio (SNR) of the pilot signal at the receiver. In cases where the asset tags (such as the first asset tag 402 and the second asset tag 404) are close to each other, the SNR on the pilot signal received at the master or slave asset tag will be very high. The higher the SNR at the receiver, the higher the accuracy of the ranging estimate. Therefore, in the case of measuring closer assets, it may be possible to improve the range estimate on the messaging link due to the high SNR on the link.

Measuring the range on a channel having a narrow bandwidth simplifies the ranging circuitry of any asset tag, such as asset tag 402 or asset tag 404. Because a higher SNR leads to a more accurate ranging estimate, one may increase the SNR further by retransmitting the pilot signals multiple times and combining the multiple received signals to increase the SNR. Instead of combining multiple pilot signals and estimating the range from the combined signal, one can also estimate the range from each pilot transmission and then average the multiple range estimates in order to improve the accuracy of the overall ranging estimate.

In summary, the asset tags receive, over a messaging link, a messaging link request signal 520A, 520B, 520N from an access point 410. In response, a ranging operation is performed between a first asset tag 402 and a second asset tag 404 of the position location system 400. The first asset tag 402 transmits a first pilot ranging signal 524A on a ranging link. The first pilot ranging signal 524A enables a ranging operation between the first asset tag 402 and second asset tag 404. The first asset tag 402 then receives a second pilot ranging signal 526A on the ranging link from the second asset tag 404.

A round trip delay between the first asset tag 402 and the second asset tag 404 may be estimated. In one configuration, the estimation of the round trip delay between the first asset tag 402 and the second asset tag 404 is performed by the first asset tag 402, or the second asset tag 404. In another configuration, the estimate of the round trip delay between the first asset tag 402 and the second asset tag 404 may be performed by a 480.

In one configuration, a position location system includes a means for receiving, over a messaging link, a request to perform a ranging operation. The receiving means also receives a first ranging pilot signal on a ranging link to enable a ranging operation between the first asset tag and the second asset tag. In one aspect of the disclosure, the receiving means may be the receive processor 258, the antennas 252 (252a, ..., 252r), the transceivers 254 (254a, ..., 254r), the controller/processor 270, the position location module 292 and/or the memory 272. In another aspect, the aforementioned means may be any module or any apparatus configured to perform the functions recited by the aforementioned means.

In this configuration, the position location system also includes a means for transmitting a first ranging pilot signal on a ranging link. In one aspect of the disclosure, the transmitting means may be transmit processor 264, the antennas 252 (252a, ..., 252r), the transceivers 254 (254a, ..., 254r), the controller/processor 270, the position location module 292, and/or the memory 272. In another aspect, the aforementioned means may be any module or any apparatus configured to perform the functions recited by the aforementioned means.

Figure 6:
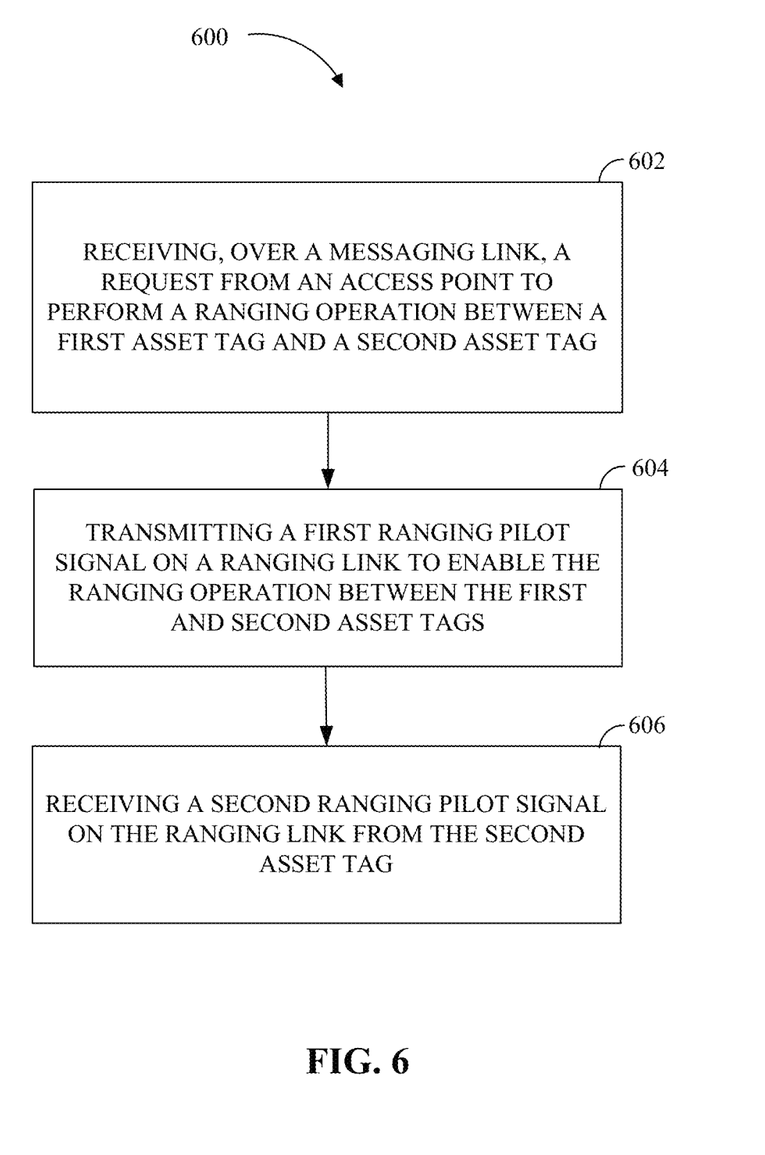
FIGS. 6 and 7 are flow charts illustrating methods in accordance with-aspects of the present disclosure.

FIG. 6 is a flow chart illustrating a method 600 in accordance with an aspect of the present disclosure. At block 602, a request is received over a messaging link. For example, as shown in FIG. 5, the request is issued from an access point 410 of a position location system 400 to perform a ranging operation between a first asset tag 402 and a second asset tag 404 of the position location system 400. At block 604, the first asset tag transmits a first ranging pilot signal on a ranging link to enable a ranging operation between the first and second asset tags. As shown FIG. 5, the first asset tag 402 transmits a first ranging pilot signal 524A on a ranging link to enable the ranging operation between the first asset tag 402 and the second asset tag 404. At block 606, the first asset tag receives a second ranging pilot signal on the ranging link from the second asset tag. As shown in FIG. 5, the first asset tag 402 receives the second ranging pilot signal 526A on the ranging link from the second asset tag 404

Figure 7:
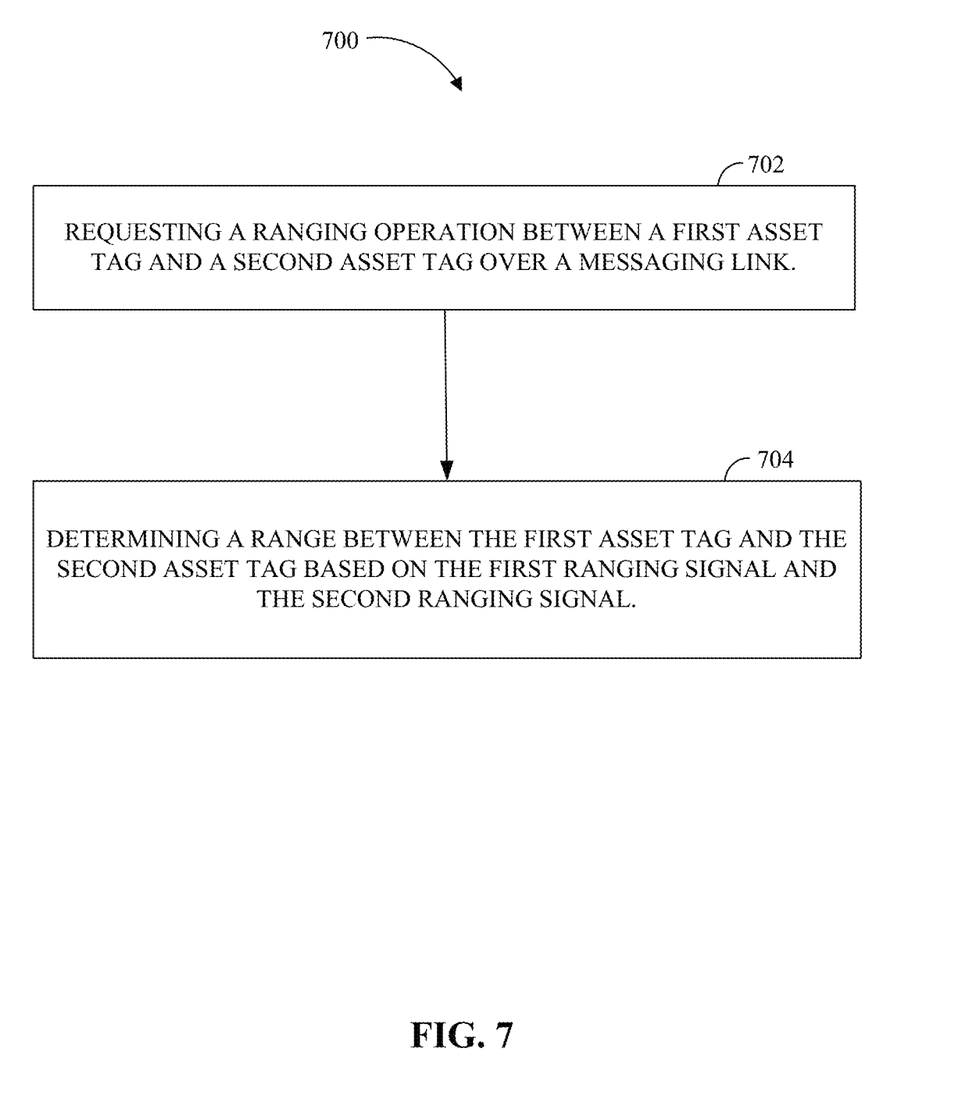

FIG. 7 is a flow chart illustrating a method 700 in accordance with an aspect of the present disclosure. At block 702, a ranging operation is requested between a first asset tag and a second asset tag over a messaging link. For example, as shown in FIG. 5, the ranging operation is requested between the first asset tag 402 and the second asset tag 404 over a messaging link 220. A first ranging signal 524A is transmitted on a ranging link between the first asset tag 402 and the second asset tag 404, and a second ranging signal 526A is transmitted on the ranging link between the second asset tag (404) and the first asset tag (402). At block 704, a range is determined between the first asset tag and the second asset tag based on the first ranging signal and the second ranging signal. The range may be determined by the access point 410, the position location server 480, or a master asset tag based on the first ranging signal 524A and the second ranging signal 526A in the configuration shown in FIG. 5.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A position location method, comprising:
   receiving, over a messaging link, a request from an access point of a position location system to perform a ranging operation between a first asset tag and a second asset tag of the position location system;
   transmitting, by the first asset tag, a first ranging pilot signal on a ranging link to enable the ranging operation between the first asset tag and the second asset tag; and
   receiving, by the first asset tag, a single copy of a second ranging pilot signal on the ranging link from the second asset tag when the ranging link is a wideband channel.

2. The method of claim 1, in which the request from the access point identifies the first asset tag as a master asset tag.

3. The method of claim 1, in which the request from the access point identifies the second asset tag as a slave asset tag.

4. The method of claim 1, further comprising estimating a round trip delay between the first asset tag and the second asset tag.

5. The method of claim 4, in which estimating the round trip delay is performed by the first asset tag.

6. The method of claim 1, further comprising forwarding ranging information to enable a position location server to estimate a round trip delay between the first asset tag and the second asset tag.

7. The method of claim 1, in which receiving the request occurs when the first asset tag and the second asset tag are within a predetermined distance of one another.

8. The method of claim 1, further comprising:
   receiving a plurality of copies of the second ranging pilot signal;
   combining the copies; and
   estimating a range between the first asset tag and the second asset tag based at least in part on the combined copies.

9. A position location system, comprising:
   a first asset tag configured to receive a request from an access point over a messaging link to perform a ranging operation; and
   a second asset tag configured to receive a first ranging pilot signal from the first asset tag over a ranging link, and further configured to transmit a second ranging pilot signal to the first asset tag over the ranging link,
   in which the first asset tag receives a single copy of the second ranging pilot signal from the second asset tag when the ranging link is a wideband channel and the ranging operation is performed based at least in part on the first ranging pilot signal and the second ranging pilot signal.

10. The position location system of claim 9, in which the request from the access point identifies the first asset tag as a master asset tag.

11. The position location system of claim 9, in which the request from the access point identifies the second asset tag as a slave asset tag.

12. The position location system of claim 9, further comprising:
   an estimator configured to estimate a round trip delay between the first asset tag and the second asset tag.

13. The position location system of claim 12, in which the estimation of the round trip delay is performed by the first asset tag.

14. The position location system of claim 9, further comprising:
   a position location server configured to receive forwarded ranging information to estimate a round trip delay between the first asset tag and the second asset tag.

15. The position location system of claim 9, in which the first asset tag receives the request when the first asset tag and the second asset tag are within a predetermined distance of one another.

16. An apparatus for position location, comprising:
   means for receiving, over a messaging link, a request from an access point of a position location system to perform a ranging operation between a first asset tag and a second asset tag of the position location system;
   means for transmitting, by the first asset tag, a first ranging pilot signal on a ranging link to enable the ranging operation between the first asset tag and the second asset tag; and
   means for receiving, by the first asset tag, a single copy of a second ranging pilot signal on the ranging link from the second asset tag when the ranging link is a wideband channel.

17. The apparatus of claim 16, further comprising means for forwarding ranging information to enable a position location server to estimate a round trip delay between the first asset tag and the second asset tag.

18. A computer program product for position location, comprising:
   a non-transitory computer-readable medium having non-transitory program code recorded thereon, the program code comprising:
   program code to receive, over a messaging link, a request from an access point of a position location system to perform a ranging operation between a first asset tag and a second asset tag;
   program code to transmit, by the first asset tag, a first ranging pilot signal on a ranging link to enable the ranging operation between the first asset tag and the second asset tag; and
   program code to receive, by the first asset tag, a single copy of a second ranging pilot signal on the ranging link from the second asset tag when the ranging link is a wideband channel.

19. The computer program product of claim 18, in which the non-transitory computer-readable medium further comprises program code to forward ranging information to enable a position location server to estimate a round trip delay between the first asset tag and the second asset tag.

20. A position location method, comprising:
   requesting a ranging operation between a first asset tag and a second asset tag over a messaging link, so that a first ranging signal is transmitted on a ranging link between the first asset tag and the second asset tag, and a single copy of a second ranging signal is transmitted on the ranging link between the second asset tag and the first asset tag when the ranging link is a wideband channel; and determining a range between the first asset tag and the second asset tag based at least in part on the first ranging signal and the second ranging signal.

21. The method of claim 20, further comprising:

monitoring positions of the first asset tag and the second asset tag; and issuing the ranging operation request to the first asset tag and the second asset tag when the first asset tag and the second asset tag are within a predetermined distance of one another.

22. The method of claim 21, further comprising:

designating the first asset tag as a master asset tag and the second asset tag as a slave asset tag;

requesting, over a narrowband messaging link, the master asset tag and the slave asset tag to perform the ranging operation; and estimating a round trip delay between the master asset tag and the slave asset tag according to the ranging operation to compute the range between the master asset tag and the slave asset tag.

23. The method of claim 20, in which the first asset tag determines the range between the first asset tag and the second asset tag.

24. The method of claim 20, in which an access point determines the range between the first asset tag and the second asset tag.

\* \* \* \* \*